(12) United States Patent
Unteregger et al.

(10) Patent No.: US 10,932,604 B2
(45) Date of Patent: Mar. 2, 2021

(54) FEEDING TUBE WITH INTEGRATED SEALING ELEMENT

(71) Applicant: KONINKLIJKE PHILIPS N.V., Eindhoven (NL)

(72) Inventors: Johann Nikolaus Unteregger, Eindhoven (NL); Iris Krassnig, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 485 days.

(21) Appl. No.: 15/534,239

(22) PCT Filed: Dec. 16, 2015

(86) PCT No.: PCT/EP2015/079984
§ 371 (c)(1),
(2) Date: Jun. 8, 2017

(87) PCT Pub. No.: WO2016/096980
PCT Pub. Date: Jun. 23, 2016

(65) Prior Publication Data
US 2017/0340158 A1 Nov. 30, 2017

(30) Foreign Application Priority Data
Dec. 18, 2014 (EP) .................... 14198714

(51) Int. Cl.
*A47J 19/02* (2006.01)
*A47J 19/06* (2006.01)

(52) U.S. Cl.
CPC ............. *A47J 19/025* (2013.01); *A47J 19/06* (2013.01)

(58) Field of Classification Search
CPC .......... A47J 19/06; A47J 19/025; A47J 43/07; A47J 19/00; A47J 19/023; E21B 17/1078;
(Continued)

(56) References Cited

U.S. PATENT DOCUMENTS 6,908,071 B2   6/2005  Roethel
8,628,117 B1 * 1/2014  Cheng ................. F16L 27/1021
                                                        285/110
(Continued)

FOREIGN PATENT DOCUMENTS

CN          2805598 Y     8/2006
CN         202874936 U    4/2013
(Continued)

*Primary Examiner* — Dana Ross
*Assistant Examiner* — Kuangyue Chen

(57) ABSTRACT

A masticating juicer (10), including a housing (20) with a mastication chamber (30) and a food chute (40), the food chute defining a feeding chamber (50) positioned above the mastication chamber. The food processing apparatus further includes a food pusher (60) configured to be insertable into, and removable from, the feeding chamber. The food chute includes a flexible sealing member (80) that extends from the food chute into the feeding chamber. The flexible sealing member configured to engage the outer circumference of the food pusher when the food pusher is inside the feeding chamber, thereby preventing the back flow of food and juice through the food chute.

19 Claims, 9 Drawing Sheets

(58) Field of Classification Search
CPC .. E21B 19/24; A23N 1/02; A23N 1/003; F16J 15/32; F16J 15/3204
USPC ....... 99/509–513, 337; 241/282.1, 92, 282.2, 241/101.01, 273.2, 273.3, 285.1, 285.3, 241/301, 38
See application file for complete search history.

(56) References Cited

U.S. PATENT DOCUMENTS

| | | |
|---|---|---|
| 9,456,712 B2 | 10/2016 | Brenna |
| 2003/0061944 A1* | 4/2003 | Fouquet ................ A47J 19/027 99/511 |
| 2007/0107609 A1* | 5/2007 | Barker ................. A47J 19/027 99/509 |
| 2012/0085847 A1* | 4/2012 | Filipitsch ................ A47J 43/07 241/33 |
| 2012/0097051 A1 | 4/2012 | Brenna |
| 2013/0074707 A1* | 3/2013 | Asbury ................... A23N 1/02 99/495 |

FOREIGN PATENT DOCUMENTS

| | | |
|---|---|---|
| CN | 203226615 U | 10/2013 |
| KR | 100532222 B1 | 12/2005 |
| WO | 2006128221 A1 | 12/2006 |
| WO | 2009062242 A1 | 5/2009 |
| WO | 2013159665 A1 | 10/2013 |

* cited by examiner

FEEDING TUBE WITH INTEGRATED SEALING ELEMENT

This application is the U.S. National Phase application under 35 U.S.C. § 371 of International Application No. PCT/EP2015/079984, filed on Dec. 16, 2015, which claims the benefit of International Application No. 14198714.9 filed on Dec. 18, 2014. These applications are hereby incorporated by reference herein.

FIELD OF THE INVENTION

The present disclosure is directed generally to a masticating juicer with an integrated sealing element to prevent the backflow of food during operation.

BACKGROUND

Fruits and vegetables have always been recognized as part of a healthy diet. However, juice extracted at home or the office from fruits and vegetables has only recently become popular. Machines that extract juice from fruits and vegetables, also known as juicers, typically include a plastic or metal housing which contains an electric motor driving a disc, screw, or other mechanism to squeeze, shred, and/or masticate food introduced to the mechanism via a food chute. The juicer will typically include a pusher that allows the user to force the food into the chute and engage with the squeezing, shredding, or masticating mechanism. Once the food is processed, the pulp will be directed to a container and the juice will be delivered to the user via a juice outlet.

Extracting juice can be a slow process since the fruits and vegetables are slowly masticated by the machine. This slow mastication improves juice extraction and is therefore highly cost efficient. However, impatient users often place fruits and vegetables into the food chute and push them down toward the masticating mechanism faster than the juicer can process the food. Not only does this reduce the functionality and cost effectiveness of the juicer, but it also results in flow back of juice, pulp, and un-masticated food particles. With enough force, this flow back can travel back up the gap between the food pusher and the walls of the food chute, where it can exit the inlet of the juicer and create a mess.

In order to prevent flow back of juice and pulp through the food chute, some food pushers have a ridge or seal attached to or formed on the outer walls of the food pusher. The ridge or seal engages the walls of the food chute when the food pusher is pushed into or pulled out of the food chute. However, a ridge or seal on the food pusher makes it difficult for the user to properly align the food pusher into the food chute. Further, if food or juice gets past the ridge or seal during use, the user will pull that food and juice out of the food chute and onto the tray of the juicer when withdrawing the food pusher, thereby creating additional mess and frustration.

Accordingly, there is a need in the art for methods and apparatus that prevent the flow back of juice, pulp, and un-masticated food particles in the food chute when using a masticating juicer.

SUMMARY OF THE INVENTION

The present disclosure is directed to inventive methods and apparatus for a masticating juicer. Various embodiments and implementations herein are directed to a food chute with integrated sealing that prevents the flow back of juice, pulp, and un-masticated food particles through the gap formed between the food pusher and the walls of the food chute. Using the various embodiments and implementations herein, the juicing of fruits and vegetables can be substantially improved by preventing the loss of juice as well as preventing messes and user frustration with the juicer.

For example, in some embodiments, the food chute includes a flexible sealing member that extends substantially horizontally from the walls of the food chute into the feeding chamber. As the user pushes food down the feeding chamber into the masticating mechanism using the food pusher, the flexible sealing member engages the outer walls of the food pusher to create a seal and prevent the flow back of food and juice. Similarly, as the user withdraws the food pusher from the feed chamber, the flexible sealing member engages the outer walls of the food pusher to effectively clean off juice and food particles adhering to the walls of the food pusher.

Placing the sealing member on the walls of the feeding chamber rather than on the walls of the food pusher provides several improvements, including better alignment of the food pusher within the chamber, prevention of messes when the user withdraws the food pusher from the chamber, and cleaning of the walls of the food pusher by the sealing member.

Generally in one aspect, a masticating juicer includes: (i) a housing with a mastication chamber and a food chute, the food chute defining a feeding chamber positioned above the mastication chamber; and (ii) a food pusher configured to be insertable into, and removable from, the feeding chamber; where the food chute includes a flexible sealing member extending from the chute into the feeding chamber, the flexible sealing member configured to engage the outer circumference of the food pusher when the food pusher is inside the feeding chamber.

According to an embodiment, the feeding chamber is vertically positioned above the mastication chamber.

According to an embodiment, the flexible sealing member is annular.

According to an embodiment, the flexible sealing member extends horizontally from the chute into the chamber.

According to an embodiment, the food chute is configured to mate and align with the food pusher within the center of feeding chamber.

According to an embodiment, the food chute comprises a food pusher alignment member configured to position the food pusher within the feeding chamber.

According to an embodiment, the food pusher alignment member comprises a plurality of vertical ribs. According to an embodiment, the plurality of vertical ribs are equidistantly spaced.

According to an embodiment, the top portion of each of the plurality of vertical ribs is angled downward.

According to an embodiment, the flexible sealing member and the food pusher alignment member are integrated.

According to an embodiment, the food pusher alignment member is positioned at the top of the feeding chamber.

According to an embodiment, the flexible sealing member is positioned directly below the food pusher alignment member.

According to an embodiment, the flexible sealing member comprises a flap that extends from the chute into the feeding chamber.

According to an embodiment, the flexible sealing member has a hardness between approximately 40 and 90 on the Shore A scale.

According to an embodiment, the flexible sealing member comprises rubber.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

These and other aspects of the invention will be apparent from and elucidated with reference to the embodiment(s) described hereinafter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION OF EMBODIMENTS

The present disclosure describes various embodiments of apparatus, systems, devices, and methods for improving the function of a masticating juicer. More generally, Applicants have recognized and appreciated that it would be beneficial to prevent the back flow of juice, masticated pulp, and food particles through the gap formed between the walls of the food pusher and the walls of the food chute. A particular goal of utilization of the embodiments of the present disclosure is to be able to prevent this flow back of juice thereby maintaining the cost effectiveness of the masticating juicer and avoiding both mess and user frustration.

In view of the foregoing, various embodiments and implementations are directed to an apparatus in which a masticating juicer includes a feeding chamber positioned above a mastication chamber, and a food pusher that fits within the feeding chamber. To prevent the flow back of juice and food, the food chute includes a flexible sealing member that extends into the feeding chamber and engages the walls of the food pusher as it enters and leaves the feeding chamber.

Figure 1:
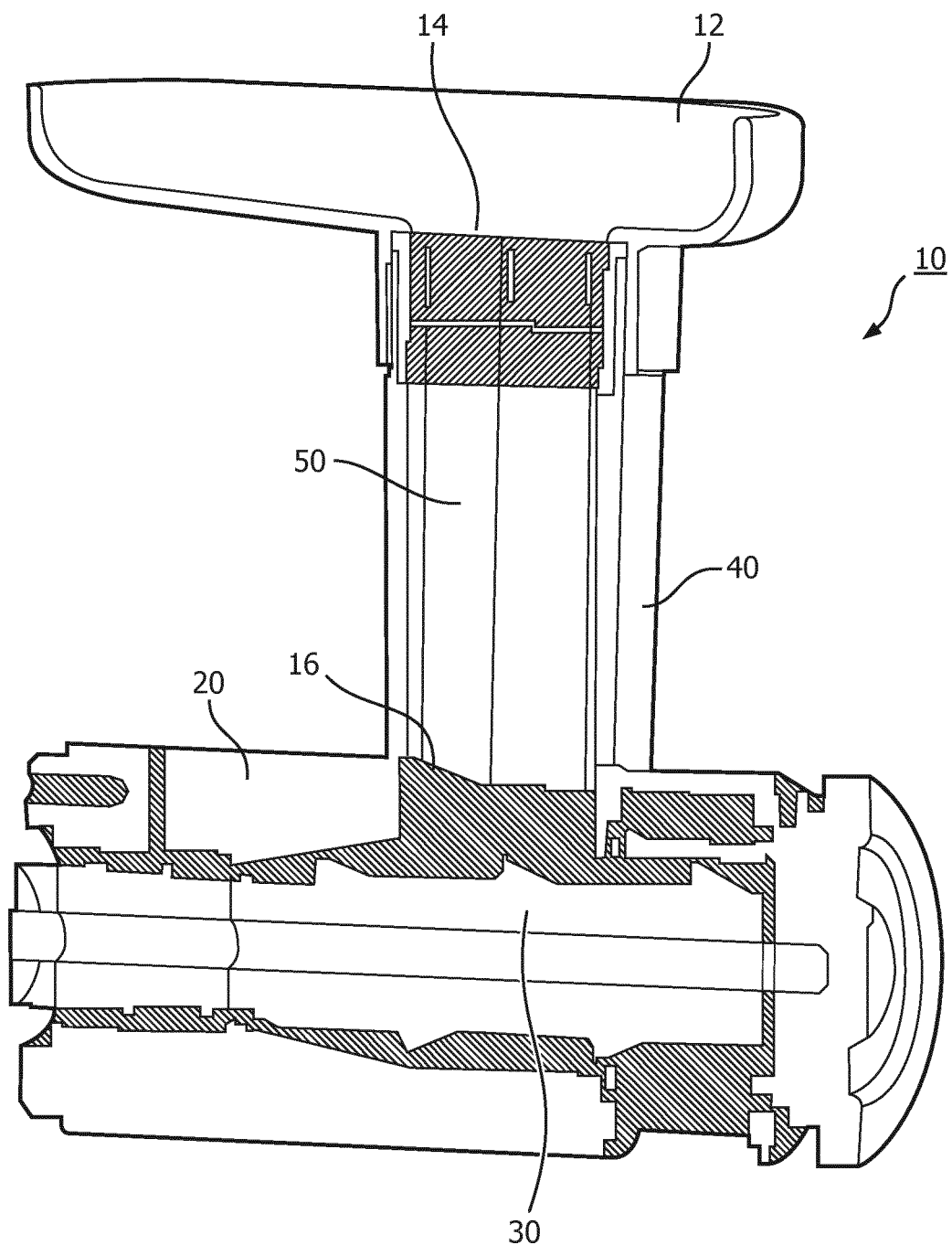
FIG. 1 is a side cutaway view of a masticating juicer in accordance with an embodiment.

Referring to FIG. 1, in one embodiment, a masticating juicer 10 is provided that includes a housing 20, a mastication chamber 30, and a food chute 40 defining a feeding chamber 50 positioned above the mastication chamber. As shown in this embodiment, the feeding chamber is vertically positioned above the mastication chamber. The feeding chamber may also be positioned angled to the mastication chamber. The housing 20 can be a variety of shapes, sizes, and materials. For example, housing 20 can be made of plastic, metal, or a combination thereof, among other materials. The housing 20 can be small to enclose a countertop masticating juicer, or can be a larger to accommodate an industrial-sized masticating juicer.

The mastication chamber 30 is sized to receive food from the feeding chamber 50 of the food chute. The mastication chamber includes a mastication mechanism that separates fruit and vegetable juice from pulp. According to one embodiment, the mastication chamber 30 is a shaft and the mastication mechanism is a rotatable auger disposed within the shaft. As the auger rotates, it mashes and masticates the fruit and vegetables, separating the juice from the pulp. The pulp exits the mastication chamber via a pulp outlet, and the juice is directed to an outlet or collection container. According to another embodiment, the mastication mechanism includes a shredder or other food processing component to assist with the separation of juice from the fruit and vegetables.

As shown in FIG. 1, food chute 40 is positioned above the mastication chamber 30, and has a central cavity, the feeding chamber 50, with an inlet 14 and an outlet 16. The food chute 40 and feeding chamber 50 can be round, square, oval, or any of a variety of shapes to accommodate food of different shapes and sizes, which can be whole or cut into pieces to fit within the chamber. The food chute 40 can optionally include a tray 12 to hold and position food for ease of loading. The outlet 16 of the feeding chamber introduces food into the mastication chamber 30 where the juice can be separated by the mastication mechanism.

Figure 2:
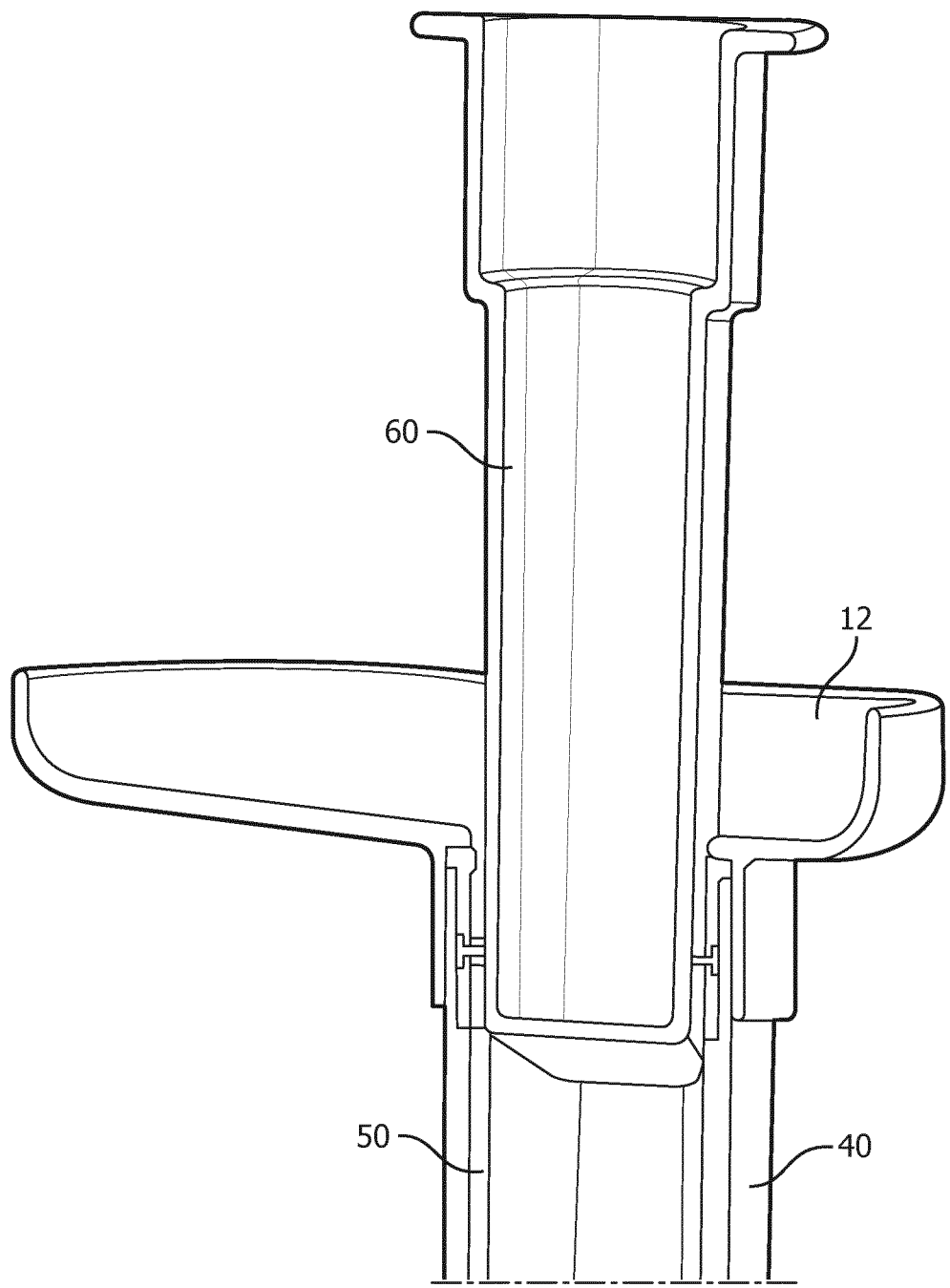
FIG. 2 is a top cutaway view of a food pusher positioned inside a food chute of a masticating juicer in accordance with an embodiment.

Referring to FIG. 2, in one embodiment, the top portion of masticating juicer 10 is provided with food chute 40 defining feeding chamber 50, and food pusher 60 positioned partially within the feeding chamber. Food pusher 60 is sized and shaped to fit comfortably within the feeding chamber 50. If the food pusher is too big, it may not fit within the feeding chamber, or it require too much force to operate. If the food pusher is too small, it will be unable to push food down to the mastication chamber, instead allowing food to remain pushed up against the sides of the feeding chamber. For example, if feed chamber 50 is circular with a diameter d, the food pusher 60 will similarly be circular with a diameter just slightly less than d. The food pusher 60 can be hollow, as shown in FIG. 2, or can be solid, among other options. During operation of the masticating juicer 10, the user places food into the feeding chamber or onto tray 12. The user then uses food pusher 60 to push the food down into the feeding chamber, forcing it to engage the mastication mechanism.

Figure 3:
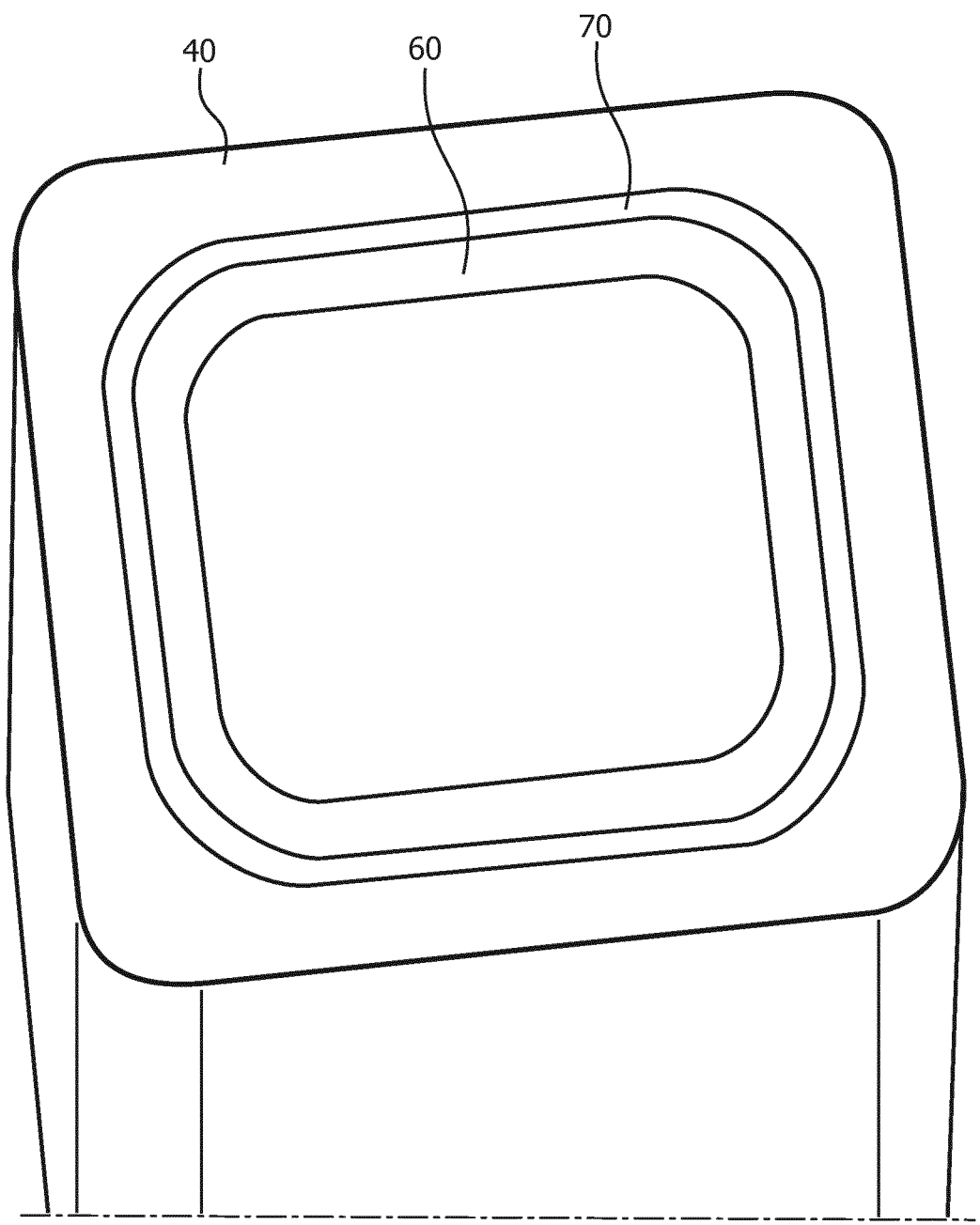
FIG. 3 is a side cutaway view of a portion of a food chute of a masticating juicer in accordance with an embodiment.

Referring to FIG. 3, in one embodiment, is a cutaway of food chute 40 with a food pusher 60 positioned within the feeding chamber. In this example, the food chute and food pusher are similarly sized and shaped, being square with rounded corners. Although the food pusher is properly sized, there is a gap 70 that forms between the food pusher 60 and the walls of the food chute 40. During operation as the user exerts a downward force on the food pusher, food inside the feeding chamber is forced toward the mastication mechanism. However, with sufficient force exerted downward on the food pusher, food and juice can travel back up the gap 70.

Figure 4:
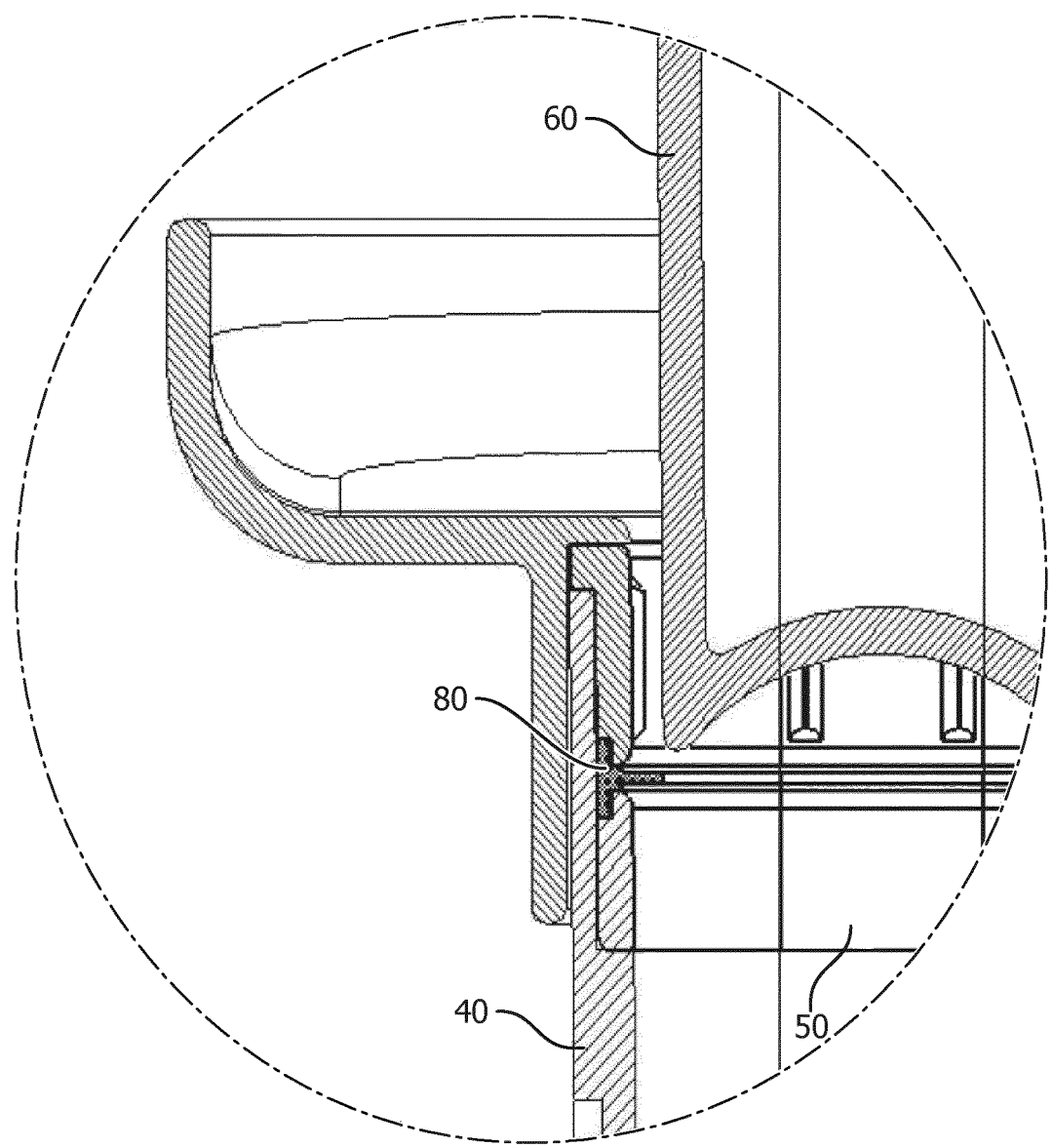
FIG. 4 is a side cutaway view of a food chute of a masticating juicer with a sealing member in accordance with an embodiment.

To prevent the backward flow of food and juice through gap 70, food chute 40 can include a flexible sealing member 80 that extends substantially horizontally from the walls of the food chute into feeding chamber 50. Referring to FIG. 4, in one embodiment, is a cutaway view of the top portion of masticating juicer 10 depicting a food chute 40 with feeding chamber 50 and flexible sealing member 80. In the embodiment depicted in FIG. 4, the flexible sealing member 80 is an annular ring, although other configurations and shapes are possible as described or otherwise envisioned herein. All around the wall of the food chute, sealing member 80 extends into the feeding chamber. Sealing member 80 is made of a material such as rubber, plastic, or some other elastomeric material. This provides flexibility that allows the sealing member to engage the walls of the food pusher 60 without exerting an excessive additional force on the food pusher. For example, according to one embodiment, the flexible sealing member 80 has a hardness measurement with a value between approximately 40 to 90 on the Shore A scale, although many other flexibilities are possible. In the embodiment depicted in FIG. 4, the sealing member is a thin ring of flexible material formed all along the walls of the feeding chamber, into which the ring extends.

Figure 5:
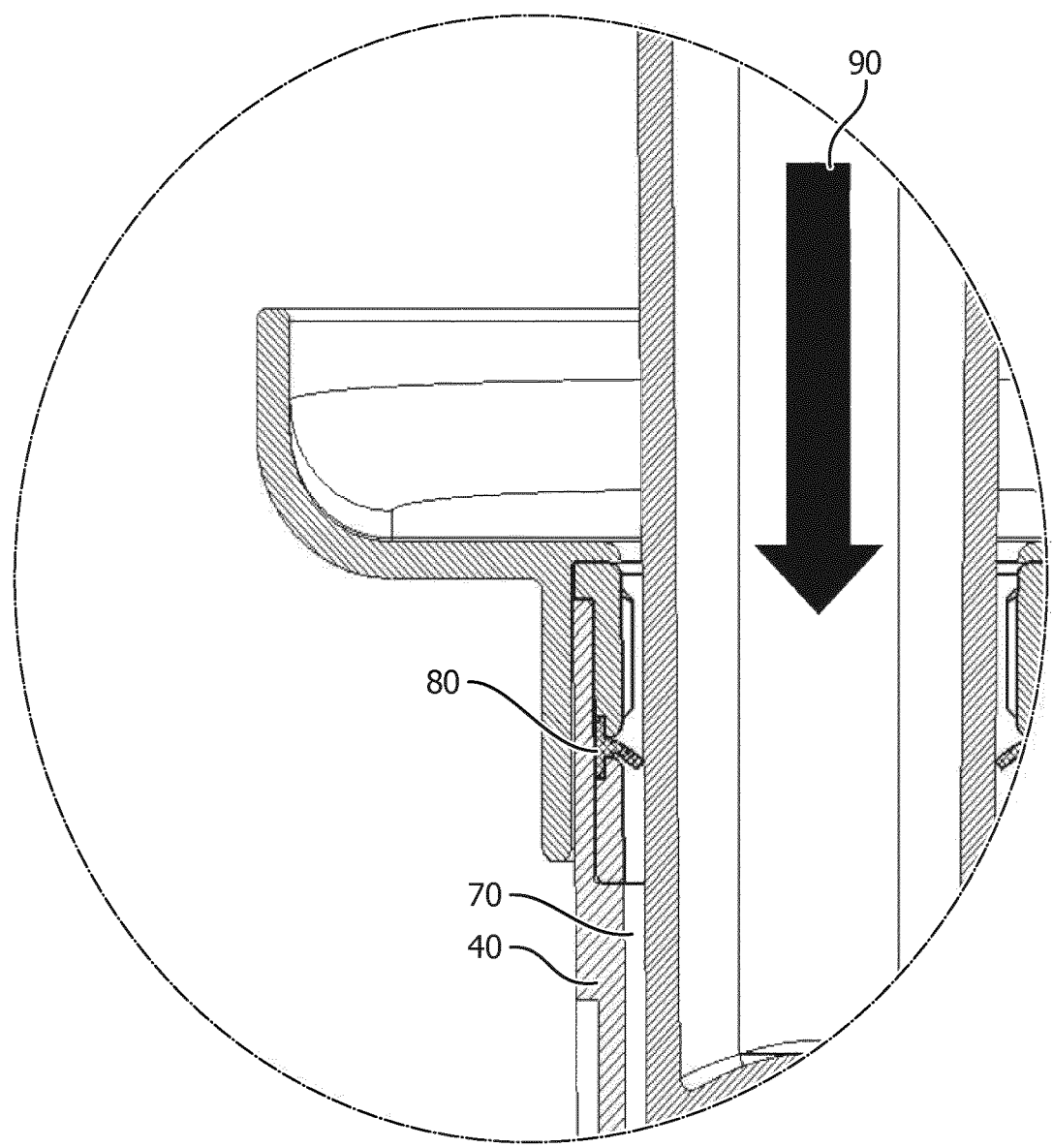
FIG. 5 is a side cutaway view of a food pusher entering the food chute of a masticating juicer in accordance with an embodiment.

Referring to FIG. 5, in one embodiment, is a cutaway view of the top portion of masticating juicer 10 depicting food chute 40 with feeding chamber 50 and flexible annular sealing member 80. In this figure, the user is exerting a downward force, in the direction of arrow 90, to push food pusher 60 into the feeding chamber, thereby pushing any food in the chamber toward the mastication chamber. The flexible annular sealing member 80 engages the sides of the food pusher, and the downward force of the food pusher forces the sealing member 80 downward. The sealing member 80 forms a food-tight and juice-tight seal against the sides of the food pusher, thereby preventing the food and juice from flowing back through gap 70.

Figure 6:
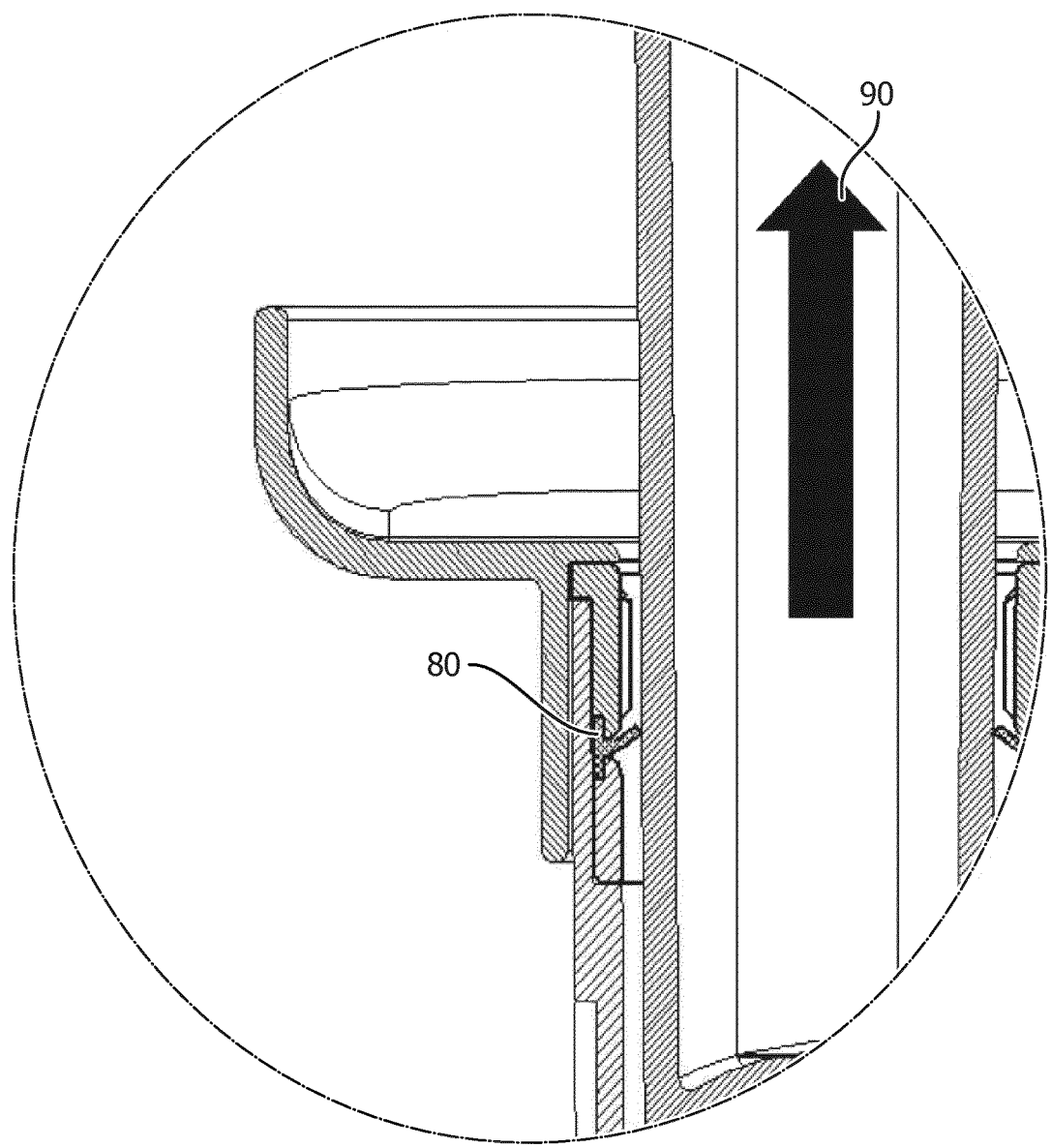
FIG. 6 is a side cutaway view of a food pusher being withdrawn from the food chute of a masticating juicer in accordance with an embodiment.

Referring to FIG. 6, in one embodiment, is a cutaway view of the top portion of masticating juicer 10 depicting food chute 40 with feeding chamber 50 and flexible annular sealing member 80. In this figure, the user is exerting an upward force, in the direction of arrow 90, to remove food pusher 60 from the feeding chamber. Once again the flexible annular sealing member 80 engages the sides of the food pusher, and the upward force of the food pusher forces the sealing member 80 upward. In addition to forming a food-tight and juice-tight seal against the sides of the food pusher to prevent food and juice from flowing back through gap 70, the sealing member 80 removes food and juice still adhering to the sides of the food pusher.

Figure 7:
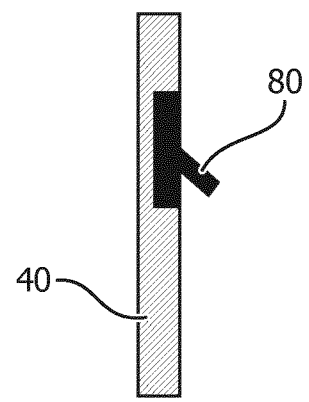
FIG. 7 is a side view of a portion of a food chute of a masticating juicer with a sealing member in accordance with an embodiment.
Figure 8:
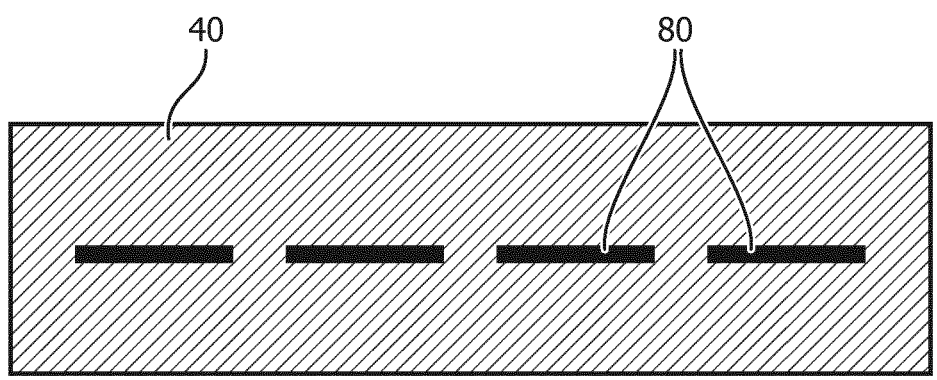
FIG. 8 is a view of a portion of a food chute of a masticating juicer with a segmented sealing member in accordance with an embodiment.

Referring to FIG. 7, in one embodiment, is a side view of a food chute 40 wall with flexible sealing member 80. In this embodiment, the flexible sealing member extends into the feeding chamber at a slight downward angle rather than horizontal. The flexible sealing member will still engage the sides of the food pusher to prevent food and juice from flowing back as the food pusher is pushed downward into the feeding chamber by the user. The flexible sealing member also engages the sides of the food pusher as the user pulls it upward out of the feeding chamber. Referring to FIG. 8, in one embodiment, is a view of a food chute 40 wall with flexible sealing member 80. In this embodiment, the flexible sealing member extends substantially horizontally into the feeding chamber, but rather than being formed all along the interior wall of the feeding chamber, the sealing member 80 is segmented.

Figure 9:
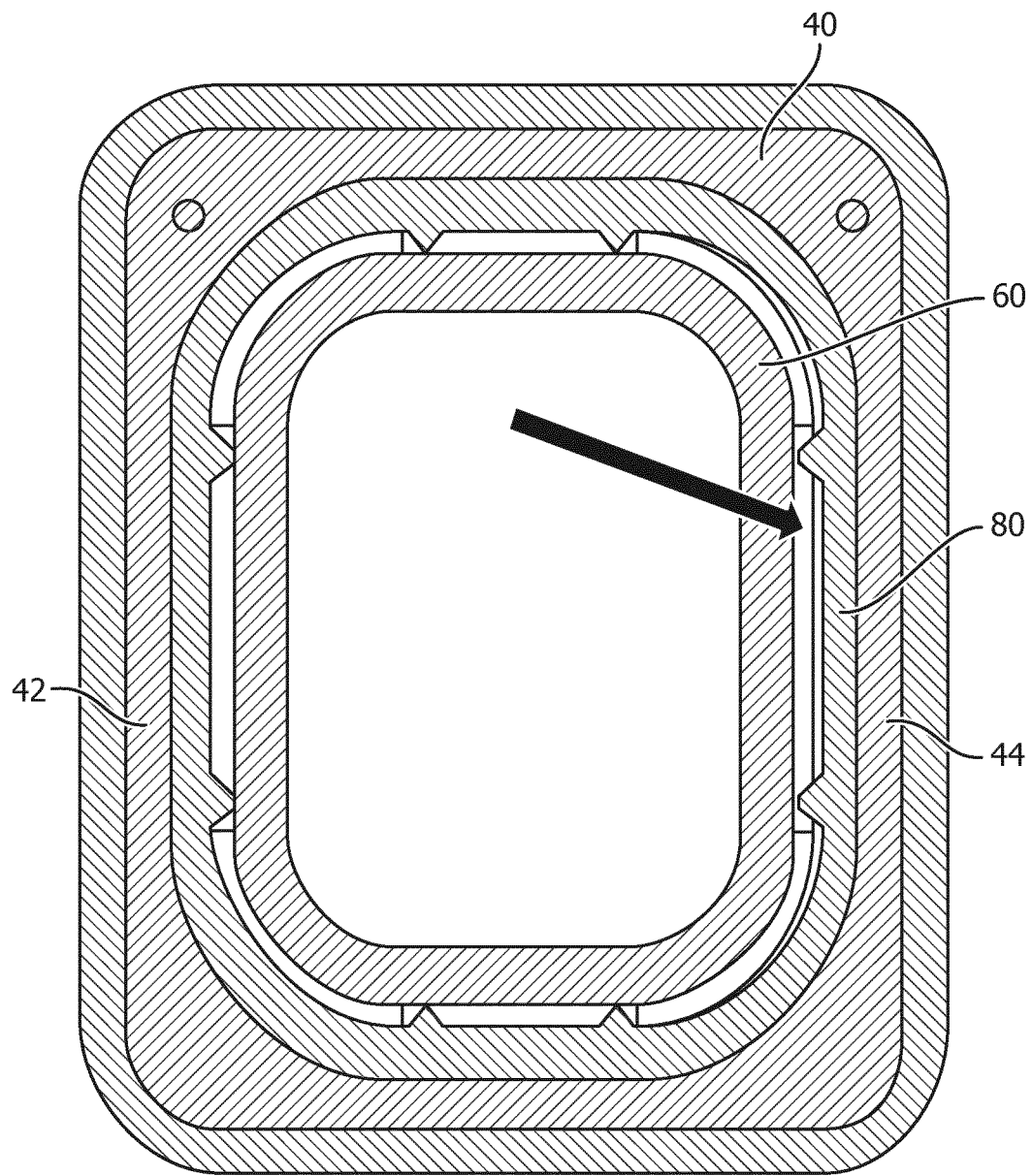
FIG. 9 is a top cutaway view of a food pusher and improperly positioned within a food chute of a masticating juicer.

The functions of flexible sealing member 80 are maximized when food pusher 60 is properly positioned within the feeding chamber 50. If the food pusher is off-center within the feeding chamber, then sealing member 80 may not form a sufficient seal all around the walls of the sealing member and the food and juice may be able to flow back through gap 70. Referring to FIG. 9, in one embodiment, is a cutaway view of the top portion of masticating juicer 10 depicting food chute 40 with the food pusher 60 in the feeding chamber and the flexible sealing member 80. However, in FIG. 9, the food pusher is not properly positioned within the feeding chamber. Instead, the food pusher is positioned too closely to side wall 42 of the food chute, and too far away from side wall 44 of the food chute, thereby creating an unacceptable gap (denoted by the arrow) between the food pusher and side wall 44.

Figure 10:
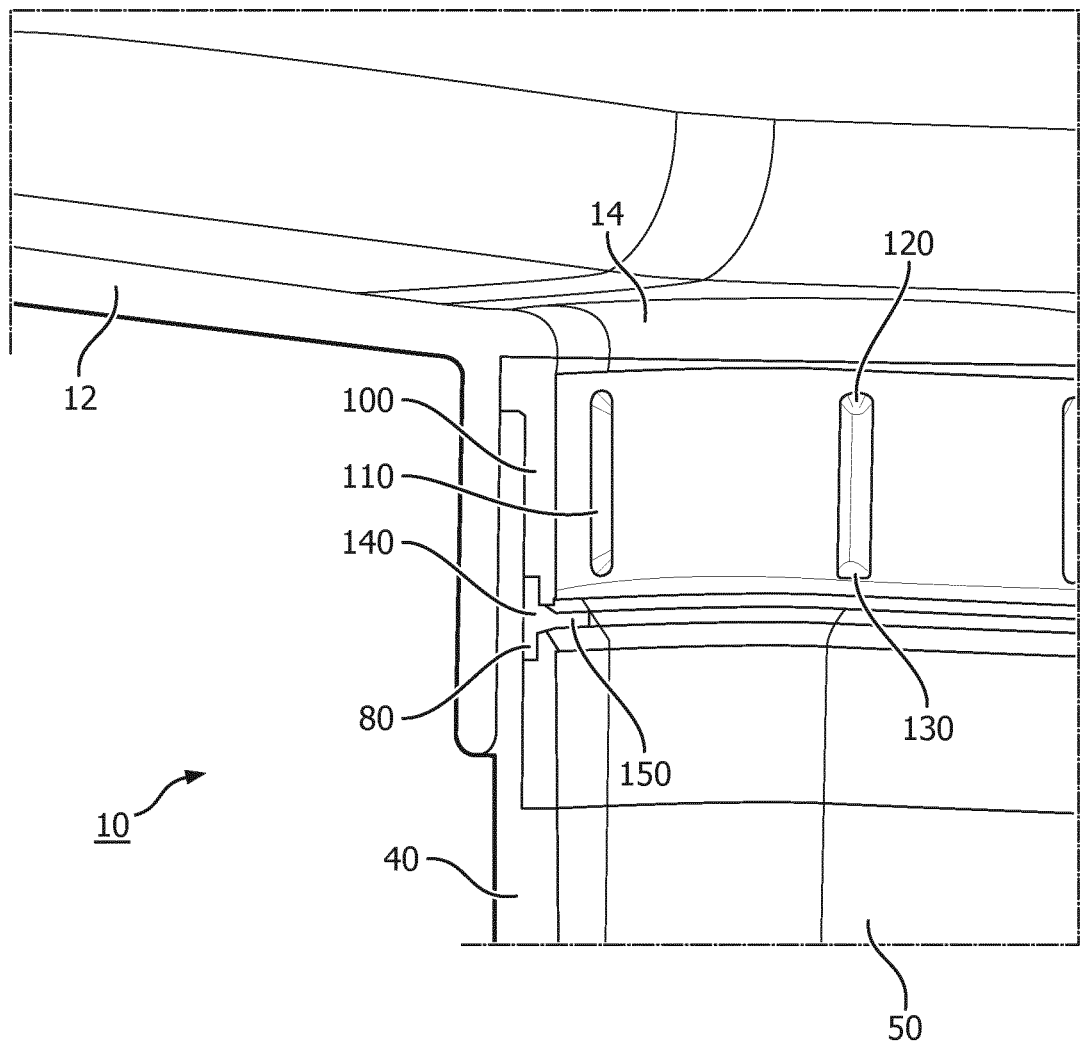
FIG. 10 is a side cutaway view of a food chute of a masticating juicer with a sealing member and food pusher alignment member in accordance with an embodiment.
Figure 11:
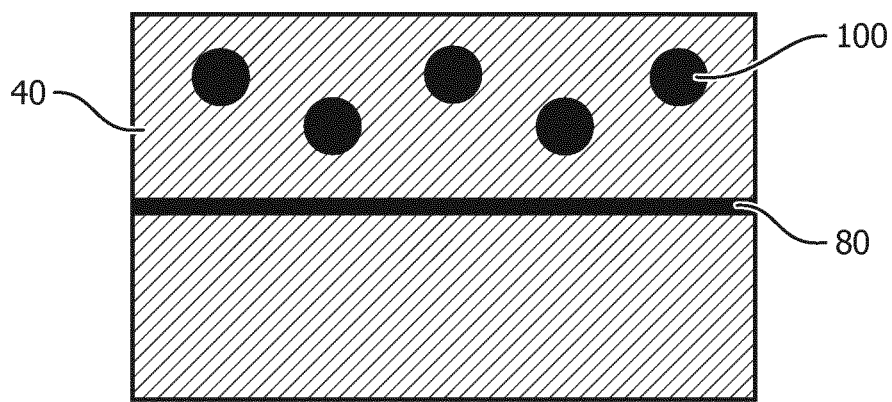
FIG. 11 is a side cutaway view of a food chute of a masticating juicer with a sealing member and food pusher alignment member in accordance with an embodiment.

To properly position food pusher 60 within the feeding chamber, according to an embodiment, the walls of food chute 40 can be provided with a food pusher alignment member 100. Food pusher alignment member 100 can be any structure that properly aligns or orients the food pusher within the feeding chamber. For example, according to an embodiment, the food pusher alignment member can be a flexible structure extending into the feeding chamber. Referring to FIG. 10, in one embodiment, is a cutaway view of the top portion of food processor 10 depicting food chute 40 with flexible annular sealing member 80. Food chute 40 also includes food pusher alignment member 100 that positions the food pusher within the feeding chamber. In this embodiment, the food pusher alignment member includes a series of vertical ribs 110 that extend into the feeding chamber. Vertical ribs 110 engage the sides of food pusher 60 and allow the food pusher to adopt only the proper position with the feeding chamber. According to one embodiment, the top 120 of each vertical rib 110 is angled downward such that the alignment member doesn't present a resistive force as the food pusher enters the feeding chamber. The food pusher alignment member can be positioned above and/or below sealing member 80. Although food pusher alignment member 100 is depicted as a series of vertical ribs 110 in FIG. 10, a variety of different structures are possible. For example, food pusher alignment member 100 can be a plurality of extensions such as nubs, knobs, blocks, or other protrusions. These protrusions can be randomly positioned, spaced equidistantly, or can adopt other configurations. Referring to FIG. 11, in one embodiment, is a side view of a portion of food chute 40 with flexible sealing member 80 and food pusher alignment member 100. In this embodiment, food pusher alignment member 100 is a plurality of rounded extensions.

Referring again to FIG. 10, in one embodiment, is a masticating juicer 10 with a food tray 12, and a food pusher alignment member 100 positioned within circular feeding chamber 50 just below the inlet 14 to the feeding chamber. Positioning the alignment member 100 just below the inlet at the top of the feeding chamber causes the food pusher 60 to be properly aligned from the moment the food pusher enters the feeding chamber. The alignment member 100 comprises a series of equidistant vertical ribs 110 that position the food pusher 20 as it enters the feeding chamber. The top portion 120 of each of the ribs 110 is angled downward such that the food pusher enters the feeding chamber with greater speed and ease. Similarly, the bottom portion 130 of each of the ribs 110 is angled upward such that the ribs will not exert a resistive force on the food pusher as the user withdraws it from the feeding chamber. In this embodiment, the alignment member 100 and the flexible annular sealing member 80 are integrated, with the sealing member located immediately below the alignment member. This allows the alignment member and the sealing member to work cooperatively to simultaneously align and form a seal with the food pusher. The circular sealing member 80 comprises a base 140 that firmly holds the member in place, and a thin, flexible ring or flap 150 that extends horizontally away from the wall of the food chute and into the feeding chamber 50 where it can engage the walls of the food pusher to provide the improved sealing and cleaning functionality.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

What is claimed is:

1. A masticating juicer, comprising:

a housing that includes a mastication chamber and a food chute, wherein the food chute defines a feeding chamber of a uniform interior horizontal cross-section along a longitudinal axis of the food chute between a feeding chamber inlet and a feeding chamber outlet, wherein the feeding chamber is positioned above the mastication chamber; and a food pusher of a uniform exterior horizontal cross-section along a longitudinal axis of the food pusher along a bottom portion thereof, the bottom portion having a length corresponding to a distance between the feeding chamber inlet and the feeding chamber outlet, wherein the bottom portion is configured to be insertable into, and removable from, the feeding chamber via the feeding chamber inlet, further wherein an exterior side of the food pusher along the longitudinal axis of the food pusher along the bottom portion thereof is separated from an interior side of the feeding chamber along the longitudinal axis thereof via a gap;

wherein the food chute further comprises a flexible sealing member, located at a top of the feeding chamber directly below the feeding chamber inlet, wherein the flexible sealing member comprises an annular flap having an inner peripheral edge extending horizontally from an interior surface of the food chute into the feeding chamber by a fixed distance greater than the gap, wherein the inner peripheral edge of the annular flap is configured to engage the exterior side of the food pusher along the longitudinal axis of the food pusher along the bottom portion thereof in response to the food pusher being inserted into and removed from the feeding chamber.

2. The masticating juicer of claim 1, wherein the feeding chamber is vertically positioned above the mastication chamber.

3. The masticating juicer of claim 1, wherein the flexible sealing member is formed all along an interior wall of the feeding chamber or segmentally along the interior wall of the feeding chamber.

4. The masticating juicer of claim 1, wherein the flexible sealing member extends horizontally from the food chute into the feeding chamber, or extends angled downward from the food chute into the feeding chamber.

5. The masticating juicer of claim 1, wherein the food chute is configured to mate and align with the food pusher within the feeding chamber.

6. The masticating juicer of claim 1, wherein the food chute comprises a food pusher alignment member configured to position the food pusher within the feeding chamber.

7. The masticating juicer of claim 6, wherein the food pusher alignment member comprises a plurality of vertical ribs.

8. The masticating juicer of claim 7, wherein the plurality of vertical ribs are equidistantly spaced.

9. The masticating juicer of claim 7, wherein a top portion of each of the plurality of vertical ribs is angled downward.

10. The masticating juicer of claim 6, wherein the flexible sealing member and the food pusher alignment member are integrated.

11. The masticating juicer of claim 6, wherein the food pusher alignment member is positioned immediately below the feeding chamber inlet at the top of the feeding chamber.

12. The masticating juicer of claim 6, wherein the flexible sealing member is positioned directly below the food pusher alignment member.

13. The masticating juicer of claim 1, wherein the flexible sealing member comprises a hardness between approximately 40 and 90 on the Shore A scale.

14. The masticating juicer of claim 1, wherein the flexible sealing member comprises rubber.

15. The masticating juicer of claim 1, wherein the flexible sealing member comprises a base, the annular flap extending from the base, wherein the base secures the flexible sealing member in place at the interior wall of the food chute and the annular flap (i) extends horizontally from the interior wall of the food chute into the feeding chamber, or (ii) extends angled downward from the interior wall of the food chute into the feeding chamber.

16. The masticating juicer of claim 1, wherein the food chute further comprises a food pusher alignment member, wherein the food pusher alignment member is configured to align or orient the food pusher into an on-center position within the feeding chamber.

17. The masticating juicer of claim 16, wherein the food pusher alignment member includes a series of vertical ribs that extend into the feeding chamber.

18. The masticating juicer of claim 16, wherein the food pusher alignment member comprises a plurality of extensions selected from the group consisting of nubs, knobs, and blocks.

19. The masticating juicer of claim 16, wherein the food pusher alignment member is positioned directly below the feeding chamber inlet at the top of the feeding chamber.

* * * * *